No. 777,337. PATENTED DEC. 13, 1904.
G. P. FENNER.
BED MOTION FOR PRINTING PRESSES.
APPLICATION FILED MAY 14, 1904.
NO MODEL. 3 SHEETS—SHEET 3.
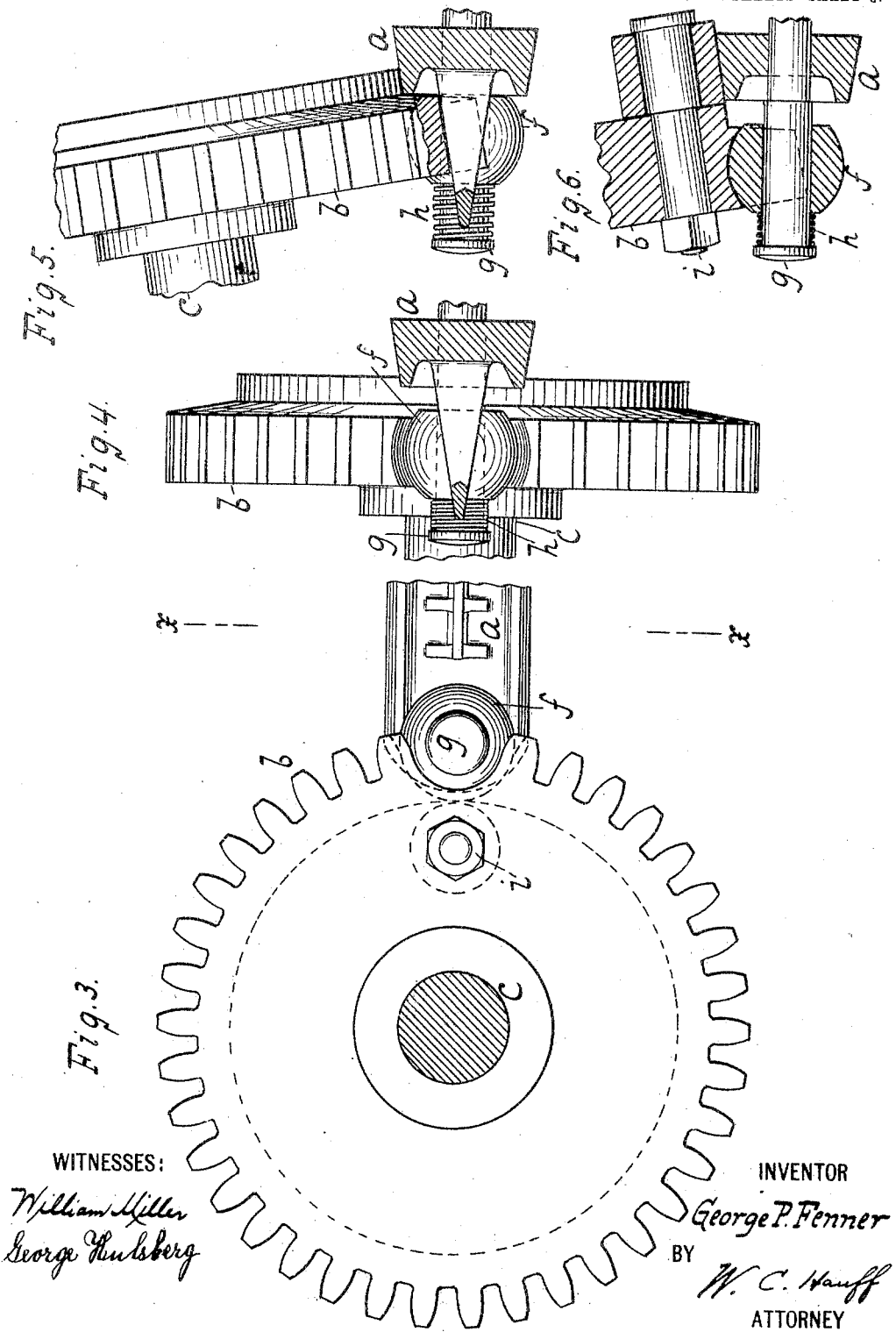
WITNESSES:
William Miller
George Hulsberg
INVENTOR
George P. Fenner
BY
W. C. Hauff
ATTORNEY No. 777,337. Patented December 13, 1904.

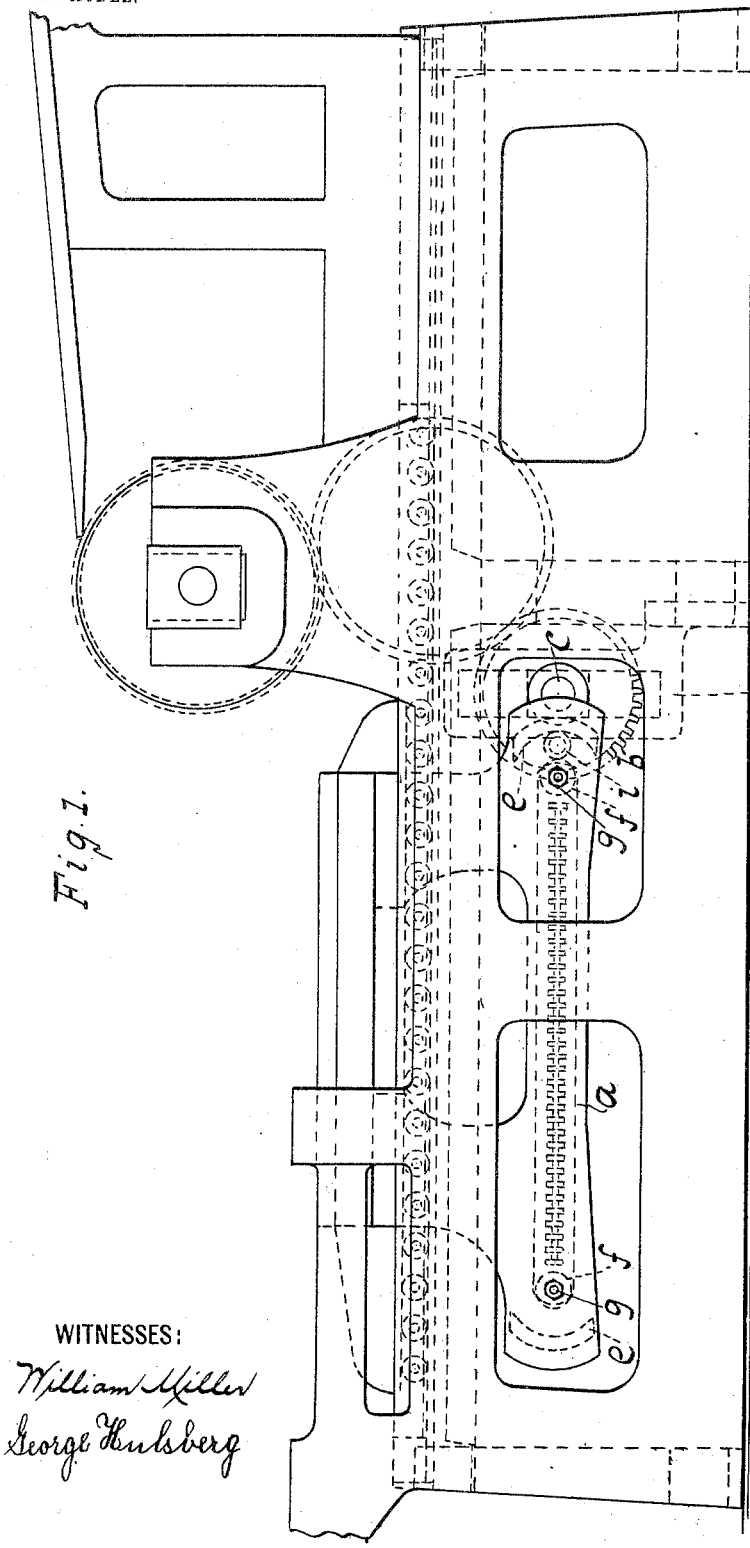

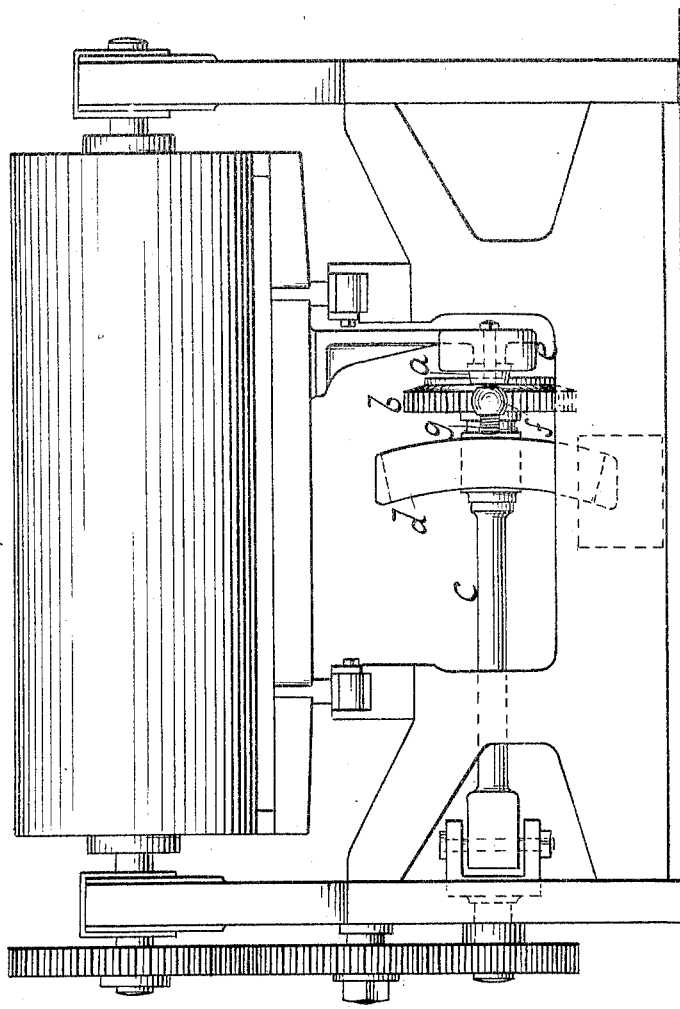

UNITED STATES PATENT OFFICE.

GEORGE P. FENNER, OF NEW LONDON, CONNECTICUT.

BED-MOTION FOR PRINTING-PRESSES.

SPECIFICATION forming part of Letters Patent No. 777,337, dated December 13, 1904.

Application filed May 14, 1904. Serial No. 207,973. (No model.)

*To all whom it may concern:*

Be it known that I, GEORGE P. FENNER, a citizen of the United States, residing at New London, county of New London, Connecticut, have invented new and useful Improvements in Bed-Motions for Printing-Presses, &c., of which the following is a specification.

This invention relates to an improvement in mangle-gear bed-motion.

According to this invention a sphere is applied at the end of the rack to be engaged by a gear during the process of stopping and starting such rack.

As made heretofore the gear has engaged a straight roll, or in some modified cases the gear has engaged an oval roll. Generally the straight roll was used. The spherical roll gives a perfect bearing between the space in the gear and the roll. When using a straight roll, because of the obliquity of the shaft the space in the gear which engages the straight roll bears at a point which is difficult to make satisfactorily. When the roll on the end of the rack is made oval and the space in the gear made straight, as has been done, the same small contact between the gear and the roll results. Neither of these is a perfect mechanism.

This invention is set forth in the following specification and claims and illustrated in the annexed drawings, in which—

Figure 1 is a side elevation of a printing-press embodying this invention. Fig. 2 is an end view of Fig. 1. Fig. 3 is a side elevation of a mangle-gear midway between its upper and lower position. Fig. 4 is a section along $x\ x$, Fig. 3. Fig. 5 is a view like Fig. 4 with parts in a different position than in Fig. 4. Fig. 6 is a sectional view of the gear and a sphere.

In the drawings are shown a rack $a$ and gear $b$. The gear or its shaft $c$ has a vertical or reciprocating motion in the arm or slot part $d$. The curve or guide $e$ at the end or reverse point of the rack is engaged by the gear or a pin or stud $i$ thereon when moving from one side to another of the rack. The operation of these parts is known.

The sphere or spherical roll $f$ at the end of the rack on stud $g$ is engaged by the gear or a space in such gear during the process of stopping and starting the rack. When the gear is in the position shown at Fig. 5, its contact with the spherical roll is perfect. The contact is also just as complete or uniform when in the position shown in Fig. 3. With a straight roll it has been found that the contact between the roll and gear is at times only at a point. Also when using an oval roll and a straight space in the gear while there is a change of parts the result is the same. With the spherical when the gear is in the position shown in Fig. 3 the sphere is moved endwise on the pin, as seen by comparing Fig. 3 or Fig. 4 with Fig. 5. In passing from one side of the gear to the other the sphere is taken from its position next to the rack, moving out toward the end of the pin, and carried back again to its original position in every case. The spring $h$ on the pin insures the roll staying at the point where the gear leaves it, so that it will be in the correct position to be engaged by the gear at the next revolution.

In case the roller $f$ should become displaced or be removed or slid out of position while the gear is in engagement with an intermediate part of the rack the spring $h$ will return the roller or move it back to the rack or to position for the gear or the space of the gear to properly reëngage the roll.

The space in the gear, as seen in the drawings, is of spherical or hollowed shape to conform to the sphere.

What I claim as my invention, and desire to secure by Letters Patent, is—

1. A mangle-gear movement comprising a gear portion and a rack and sphere for engagement by the gear, said gear having a spherical recess corresponding to the sphere, so that uniform or perfect bearing is maintained between the parts during reverse.

2. A mangle-gear movement comprising a rack a sphere at the end of the rack and a gear made to engage the sphere during stopping and starting of the rack, said gear having a seat or recess corresponding to the sphere to maintain perfect contact.

3. A mangle-gear movement comprising a rack and sphere and a gear having a spherical space corresponding to the sphere to make uniform or perfect engagement in various positions as the gear tilts or inclines during reversing.

4. A bed-driving gear with a hemispherical space and a rack having at each end a spherical roll to engage the said space in the gear, the spherical roll constructed to move endwise on its bearing during its contact with the gear.

5. A gear combined with a rack and spherical roll and a spring to hold the spherical roll in its proper position to be engaged by the gear.

In testimony whereof I have hereunto set my hand in the presence of two subscribing witnesses.

GEORGE P. FENNER.

Witnesses:
 MAURICE E. SHERMAN,
 A. A. SMITH.